W. C. CHAPMAN
Rice Screen.
No. 104,112.    Patented June 14, 1870.
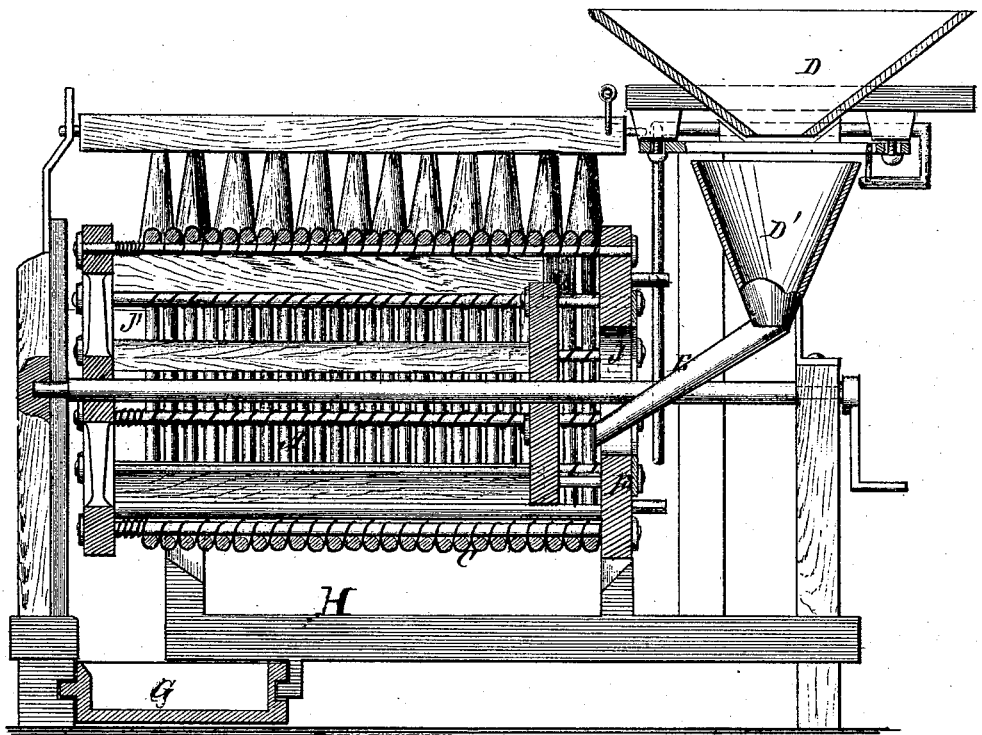
Fig. 2
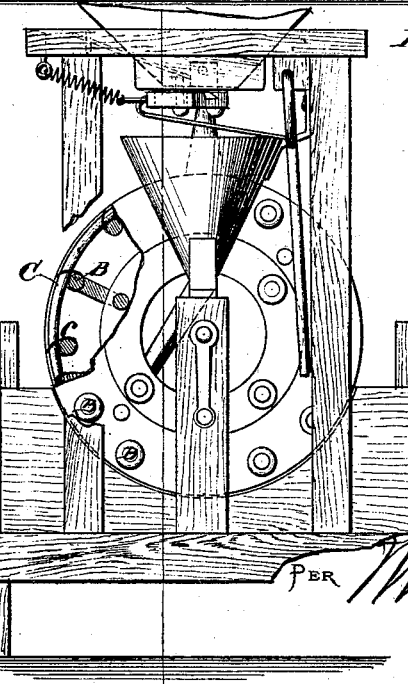
Witnesses:
John Becker
P. S. Mabee
Inventor:
W. C. Chapman
per
Attorneys.

UNITED STATES PATENT OFFICE.

WILLIAM C. CHAPMAN, OF CHARLESTON, SOUTH CAROLINA.

IMPROVEMENT IN RICE-SCREENS.

Specification forming part of Letters Patent No. 104,112, dated June 14, 1870.

*To all whom it may concern:*

Be it known that I, WILLIAM C. CHAPMAN, of Charleston, in the district of Charleston and State of South Carolina, have invented a new and useful Improvement in Screens; and I do hereby declare that the following is a full, clear, and exact description thereof, which will enable others skilled in the art to make and use the same, reference being had to the accompanying drawing, forming part of this specification.

My invention relates to machines for removing from rice the cockle and small seeds which commonly grow and ripen about the same time with it.

The invention consists in certain improvements upon the cylinder, which will be hereinafter described, with all that is necessary to a clear understanding thereof, and then specified in the claims.

Figure 1 of drawing represents a longitudinal section of my improved machine, and Fig. 2 an end view thereof.

A represents spiral cross-wires, preferably round or oval; B, longitudinal ribs; and C, tie-wires by which the cross-wires are lashed to the ribs.

The difference between the size of rice and cockle not being very great, and both grains being small, it is a nice point to regulate the intervals between the wires so that the one shall be retained, while the other is discharged. This is accomplished by fastening the cross-wires to ribs a short distance apart, and employing tie-wires C to pass between them, whose size is a mean between the rice and the cockle. Thus are obtained circular apertures, which will hold the rice, but allow the cockle to escape.

D D are hoppers, through which the rice is fed, and E is a channel leading therefrom into the cylinder. F is a head to the cylinder, with an opening in the middle thereof.

The other parts of the machine may be made as shown in drawing, or of such other construction as will readily suggest itself to any ordinary mechanic.

It will be observed that the cross-wires are not carried entirely to the end of the ribs farthest removed from the hopper, but leave an annular opening, I', at the end thereof.

The mode of operation is as follows: The uncleaned grain, being placed in the hoppers, passes through channel E, and is moved around and around in the cylinder. The spirality of the wires tends to convey it gradually to the other end, where it is discharged through space I', and drops into the drawer G.

While passing through the length of the cylinder, all smaller seeds, including the cockle, are eliminated and worked through the apertures between the cross-wires, so as to fall into receptacle H.

Having thus described all that is necessary to a clear understanding of my invention, what I esteem to be new, and desire to protect by Letters Patent, is—

1. The combination of the screen-cylinder, consisting of the spiral cross-wires A and longitudinal ribs B, placed at short intervals apart and fastened by tie-wires C, with the hopper D and D', constructed and arranged as herein shown and described, for the purposes set forth.

2. The arrangement of the screen-cylinder herein described, grain-inlet J, and rice-outlet J', hopper D and D', with spout E, all constructed substantially as herein shown, and for the purpose set forth.

WILLIAM C. CHAPMAN.

Witnesses:
GEO. J. THOMPSON,
W. S. ADAMS.